Figure 1:
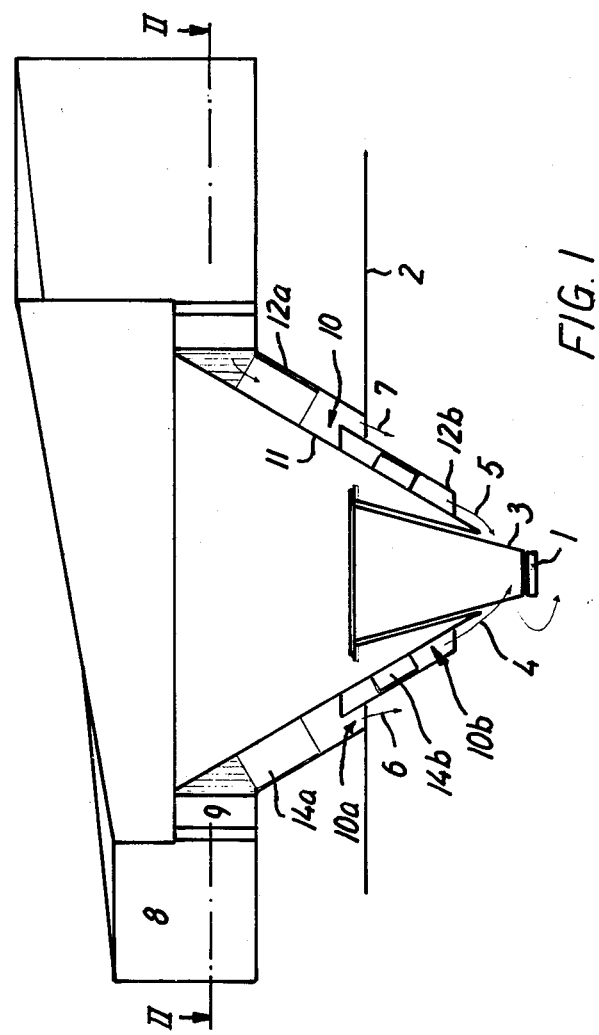

United States Patent [19]

Larsson et al.

[11] 4,227,896

[45] Oct. 14, 1980

[54] GAS DISTRIBUTION DEVICE FOR THE SUPPLY OF A PROCESSING GAS TO AN ATOMIZING CHAMBER

[75] Inventors: Finn H. Larsson, Tastrup; Christian Schwartzbach, Malov, both of Denmark

[73] Assignee: A/S Niro Atomizer, Søborg, Denmark

[21] Appl. No.: 63,884

[22] Filed: Aug. 3, 1979

[30] Foreign Application Priority Data

Aug. 17, 1978 [DK] Denmark .............................. 3640/78

[51] Int. Cl.² ............................................ B01D 47/16
[52] U.S. Cl. .......................................... 55/260; 55/226; 55/230; 159/4 B; 159/4 S; 261/79 A; 261/88; 261/89; 261/118
[58] Field of Search ................... 261/78 A, 96, 79 A, 261/88, 109, 89, 118; 55/226, 230, 260, 442–445, 459 R, 459 C; 159/4 R, 4 B, 4 S

[56] References Cited

U.S. PATENT DOCUMENTS

| | | | |
|---|---|---|---|
| 1,961,956 | 6/1934 | Bleibtrev et al. ..................... | 55/226 |
| 3,073,095 | 1/1963 | Hungate ................................ | 55/230 |
| 3,112,239 | 11/1963 | Andermatt ............................ | 159/4 B |
| 3,175,340 | 3/1965 | Schulze .......................... | 261/79 A X |
| 3,596,885 | 8/1971 | Stone ............................... | 55/260 X |
| 3,789,582 | 2/1974 | Graybill ............................ | 55/260 X |
| 3,803,723 | 4/1974 | Lamm et al. ..................... | 159/4 B X |

FOREIGN PATENT DOCUMENTS

| | | | |
|---|---|---|---|
| 499847 | 3/1951 | Belgium ...................................... | 55/260 |
| 70827 | 1/1970 | Fed. Rep. of Germany ............. | 55/260 |
| 80661 | 3/1971 | Fed. Rep. of Germany ............. | 55/260 |
| 1289817 | 2/1962 | France ........................................ | 55/260 |

Primary Examiner—Richard L. Chiesa
Attorney, Agent, or Firm—Sughrue, Rothwell, Mion, Zinn and Macpeak

[57] ABSTRACT

A processing gas is supplied to the atomizing zone around an atomizing device arranged centrally in an atomizing chamber through a conical guide duct communicating with a horizontal spiral supply duct through an annular mouth. A uniform gas distribution with respect to flow direction and velocity is obtained by means of guide vanes arranged with a small angular spacing in the mouth and comprising two succeeding vane sets, in which the vanes of one set are shaped to deflect the tangential gas stream in the spiral duct to a flow direction, for which the radial velocity component considerably exceeds the tangential component, whereas each vane of the other set positioned at the opening of the mouth towards the conical guide duct projects into the space between neighboring vanes of the first set and extends substantially parallel to tangential planes to said vanes at their internal edges.

2 Claims, 3 Drawing Figures

GAS DISTRIBUTION DEVICE FOR THE SUPPLY OF A PROCESSING GAS TO AN ATOMIZING CHAMBER

The invention relates to a gas distribution device for supplying a processing gas to an atomizing zone around an atomizing device arranged centrally in an atomizing chamber, said processing gas being conducted from a horizontal spiral supply duct through an annular mouth extending in rotational symmetry around the axis of the chamber into the space between two conical guide walls extending around and above the atomizing device, guide vanes being provided in said mouth for imparting a change of direction to the gas stream from a mainly purely tangential flow in the spiral duct into a rotating flow with a smaller tangential velocity component in the space between the conical guide walls.

By atomizing chambers is herein to be understood processing chambers for different processes, such as drying, cooling and absorption, in which a liquid which may be a homogenous substance, a solution or a suspension, is atomized by means of an atomizing device such as a rotating atomizer wheel arranged centrally in the normally mainly cylindrical chamber.

The atomized material leaves the atomizing device in mainly horizontal radial directions out into an atomizing zone. In the processes in question, one or the other kind of a processing gas is most frequently supplied to this atomizing zone for achieving a desired result. In a drying process, for example, a heated drying gas which may be atmospheric air or an inactive gas may be supplied. In other processes, gases may be supplied which perform other physical or chemical reactions with the atomized liquid.

For obtaining a distribution of the supplied processing gas around the atomizing device which in respect of rotational symmetry is as uniform as possible, use is most frequently made of a distribution device of the above mentioned kind, in which the gas is conducted from the horizontal spiral supply duct which is positioned at a higher level than the atomizing device through said mouth into the conical duct formed by the space between the conical guide walls, the annular mouth of said conical duct being positioned in a horizontal plane immediately overlying the atomizing zone.

In order to obtain uniformity of the gas distribution throughout the length of the internal opening of the mouth towards the conical duct, there has been used in the constructions hitherto known a relatively high working pressure in the spiral duct in combination with a plate grid in the form, for example, of a perforated plate arranged in the mouth, said grid having caused a relatively high pressure drop, such as disclosed in French Patent Specification No. 1,289,817. Since such plate grids do not per se exert any essential directional effect on the gas, a desired flow direction with a downwards directed rotating movement could subsequently be imparted to the amount of gas supplied into the conical duct by means of guide vanes arranged in the conical duct. Likewise, it is known to divide the conical guide ducts for producing two gas streams passing through the atomizing zone with different directions, such as an internal mainly axially downwards directed annular stream and an external spirally downwards directed gas stream with a relatively high rotational component.

From the specifications of Belgian Pat. No. 499,847 and GDR (German Democratic Republic) Pat. No. 80,661, it is known to conduct gas either from an annular supply duct directly into an atomizing chamber or from a spiral supply duct into a conical guide duct communicating therewith by means of adjustable guide vanes arranged in the annular mouth between the supply duct and the atomizing chamber or the conical duct, respectively. However, in these prior art constructions, the gas distribution has been relatively casual, and no unambiguous directional guiding of the supplied gas into a downwards directed stream with a certain rotation in the conical guide duct has been obtained due to the rather complex and critical adjustment of the individual dampers and a relatively great angular spacing thereof.

It is the object of the invention to provide a gas distribution device, by means of which an optimum and with respect to rotational symmetry, uniform distribution of the processing gas supplied in the spiral duct at the internal opening of the mouth towards the conical guide duct is obtained at a considerably lower pressure drop across the mouth, and by which there is furthermore obtained already at this place an unambiguous directional guiding of the gas stream into a downwards directed spiral path with a relatively low rotational component in the conical guide duct.

In order to achieve this, a gas distribution device according to the invention is characterized in that the guide vanes are arranged in the mouth with a small angular spacing and comprise two succeeding sets of stationary guide vanes, in which the guide vanes of one set positioned at the external opening of the mouth towards the spiral duct are shaped to deflect the gas stream to a flow direction, for which the radial velocity component considerably exceeds the tangential velocity component, whereas each vane of the other vane set positioned at the internal opening of the mouth towards the space between the conical guide walls projects into the space between the internal portions of neighbouring vanes of the first vane set and extends substantially parallel to tangential planes to these vanes at the internal edges thereof.

Through the use of two guide vane sets shaped and arranged in this manner with closely positioned guide vanes, such an equalization of the velocity distribution in the space between each pair of neighbouring vanes in the one direction-changing vane set is obtained that throughout the internal opening of the mouth towards the conical guide duct, a uniform gas distribution is obtained substantially without any observable velocity variations. In addition, the vanes of the other vane set positioned towards the conical duct exert such a directional effect on the gas streams passing through the first vane set that at any place at the internal opening of the mouth towards the conical guide duct, a well defined flow direction forming a relatively small angle with a radial plane in the gas distribution device is obtained, so that the entire amount of gas is conducted into the conical guide duct as a spiral stream with a strong radial and, thus, downwards directed velocity component and a relatively smaller rotational component.

Subsequently, a further change of direction, possibly after division into two partial streams, may be imparted to this gas stream by means of guide vanes in the conical duct. The pronounced uniform distribution along the internal side of the mouth of the gas stream entering into the conical duct with respect to flow direction as well as velocity facilitates the adjustment and regulation of subsequent guide vanes and, thus, the achievement of a rotational symmetrically uniform gas supply to the atomizing zone, whereby the atomized material is subjected to a considerably more uniform influence from the processing gas than in the gas distribution devices hitherto known.

As a result of the use of stationary guide vanes, the guide vanes per se may form distance members, so that separate stay or supporting means in the mouth may be dispensed with.

Figure 2:
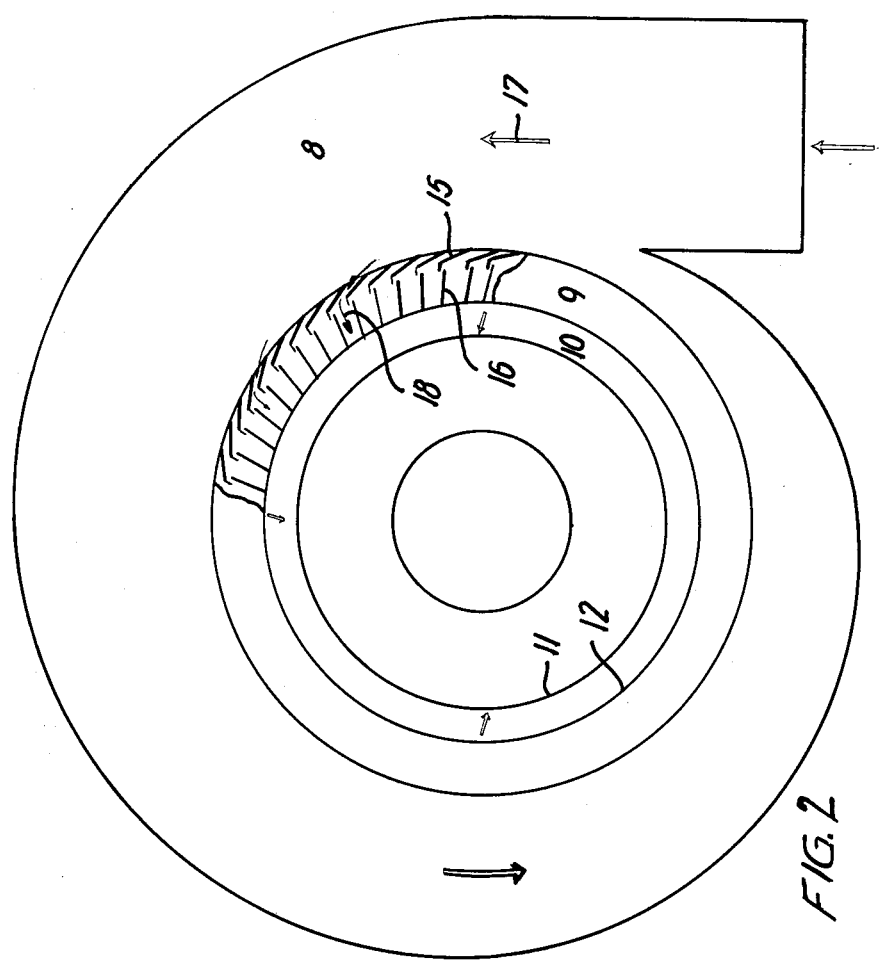
Figure 3:
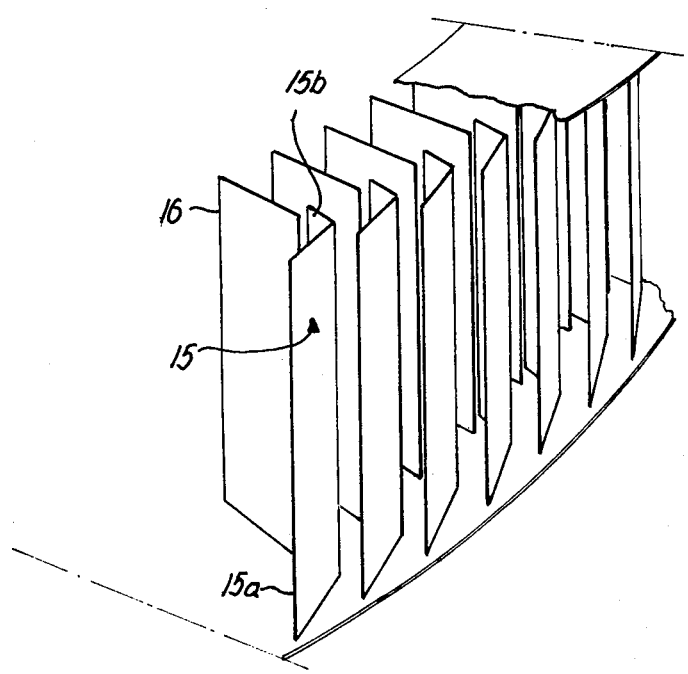

In the following, the invention will be further explained with reference to the accompanying drawings, in which FIG. 1 is a simplified vertical sectional view of an embodiment of a gas distribution device according to the invention, FIG. 2 is a horizontal sectional view along the line II—II in FIG. 1, and FIG. 3 is a perspective view for illustrating the guide vanes in the embodiment shown in FIGS. 1 and 2.

In FIGS. 1 and 2 a rotating atomizing device, such as an atomizer wheel, is shown at 1, which device is presupposed to be arranged centrally in the upper part of an atomizing chamber, of which only the underside of the chamber ceiling is indicated at 2.

The atomizing device 1 is positioned at the bottom of a conical skirt 3 surrounding the lower part of drive means, not shown, for the atomizing device, through which skirt the liquid to be atomized is supplied in the form of homogenous substance, a solution or a suspension in a manner not further illustrated.

To the atomizing zone of the chamber which is situated radially around the atomizing device 1, there shall be supplied by means of a gas distribution device according to the invention a processing gas adapted to the process, such as drying, cooling or absorption, to which the supplied material is to be subjected after atomization by means of the atomizing device 1. In a drying process, the processing gas may consist, for example, of heated atmospheric air.

In many cases, the processing gas is caused to pass through the atomizing chamber in two separate streams, i.e. an internal stream supplied to the atomizing zone from above with a strong downwards directed movement, as shown by arrows 4 and 5, and an external stream carried through the chamber at a greater distance from the atomizing device 1, as shown by arrows 6 and 7, and with a strong rotational component.

The processing gas is supplied from a fan device, not shown, through a spiral supply duct 8 arranged above the ceiling 2 of the atomizing chamber, said supply duct communicating through an endless annular mouth 9 with a conical guide duct 10. This guide duct 10 is restricted to one side by an internal conical guide wall 11, the lower end of which is connected to the skirt 3 and, in the example illustrated, in which two separate streams of processing gas are to be produced, the duct 10 is divided, by means of two external conical guide walls 12*a* and 12*b* spaced differently from the guide wall 11 and overlapping each other on a small portion only at the underside of the chamber ceiling 2, into an external channel 10*a* opening at the underside of the chamber ceiling 2 for producing the above mentioned external stream of processing gas, and an internal channel 10*b* to which only a part of the amount of gas passing through the duct 10*a* is supplied and which opens some distance below the underside of the chamber ceiling 2 for producing the above mentioned internal stream of processing gas.

For each of the two streams of processing gas, the flow direction is determined by guide vanes, as shown at 14*a* and 14*b* in the ducts 10*a* and 10*b*.

For obtaining an optimum and, with respect to rotational symmetry, uniform distribution of the processing gas conducted from the spiral supply duct 8 into the conical guide duct 10, there are arranged in the mouth 9, according to the invention, two succeeding sets of stationary guide vanes 15 and 16, respectively, in which the vanes in one vane set positioned at the opening of the mouth 9 towards the spiral duct 8 are shaped to deflect the gas stream from the purely tangential flow shown by an arrow 17 in the duct 8 to a flow direction shown by arrows 18, for which the radial velocity component inwards to the axis of the gas distribution device considerably exceeds the tangential velocity component, whereas each of the vanes 16 in the other vane set at the internal opening of the mouth 9 towards the conical guide duct 10 projects into the space between the internal portions of neighbouring vanes in the first vane set and extends substantially parallel to tangential planes to these vanes at their internal edges, i.e. parallel to the direction to which the gas stream has been deflected by these neighbouring vanes.

In the embodiment shown in the drawings, each vane 15 has a bend form composed of two substantially plane portions 15*a* and 15*b*, but these vanes may also have a more uniformly curved cross sectional shape which can provide the desired deflection of the gas stream in the duct 8. The vanes 16 are shown as flat guide vanes, but should only extend substantially parallel to the vane parts 15*b*, so as to stabilize the gas streams to the directions to which they have been deflected by the vanes 15.

The magnitude of the deflection angle may vary somewhat according to the kind of processing gas and the supply velocity thereof and with a consideration to the desired progress of the final gas streams through the atomizing zone. For many applications, such a strong deflection will be suitable that the gas streams leave the vanes 16 under an angle of 15°, for example, with axial planes in the mouth since, thereby, a gas supply is obtained at the upper end of the conical guide duct 10 with a suitably low, but well defined rotation.

The detailed construction of the vanes 15 and 16 may be as shown in the perspective view in FIG. 3. In order to obtain the desired gas distributing and directional guiding effect, it is essential that the vanes 15 and 16 in the two vane sets are positioned at a small angular spacing in the mouth 9, preferably such that the spacing of neighbouring vanes is smaller than the radial extension of the mouth 9 between the internal opening of the duct 8 and the inlet opening to the conical guide duct 10.

The vanes may be manufactured by simple stamping and folding or bending of vane members of a plate material, such as steel, which is resistant to the possibly corroding influences from the processing gas.

What is claimed is:

1. A gas distribution device for supplying a processing gas to an atomizing zone around an atomizing device arranged centrally in an atomizing chamber, comprising a horizontal spiral supply duct for said processing gas, said duct having an annular mouth extending in rotational symmetry around the axis of the chamber, and two conical guide walls extending around and above the atomizing device, said guide walls limiting a space communicating with said mouth, guide vanes being provided in said mouth for imparting a change of direction to the gas stream from a mainly purely tangential flow in the spiral duct into a rotating flow with a smaller tangential velocity component in the space between the conical guide walls, wherein the improvement comprises that the guide vanes are arranged in the mouth with a small angular spacing and comprise two succeeding sets of stationary guide vanes, the guide vanes of one set being positioned at the external opening of the mouth towards the spiral duct and being shaped to deflect the gas stream to a flow direction, for which the radial velocity component considerably exceeds the tangential velocity component, the other vane set being positioned at the internal opening of the mouth towards the space between the conical guide walls, and each vane of said other vane set projecting into the space between the internal portions of neighbouring vanes of the first vane set and extending substantially parallel to tangential planes to these vanes at the internal edges thereof.

2. A gas distribution device as claimed in claim 1, wherein the spacing of the vanes is smaller than the radial extension of the mouth.

* * * * *